UNITED STATES PATENT OFFICE.

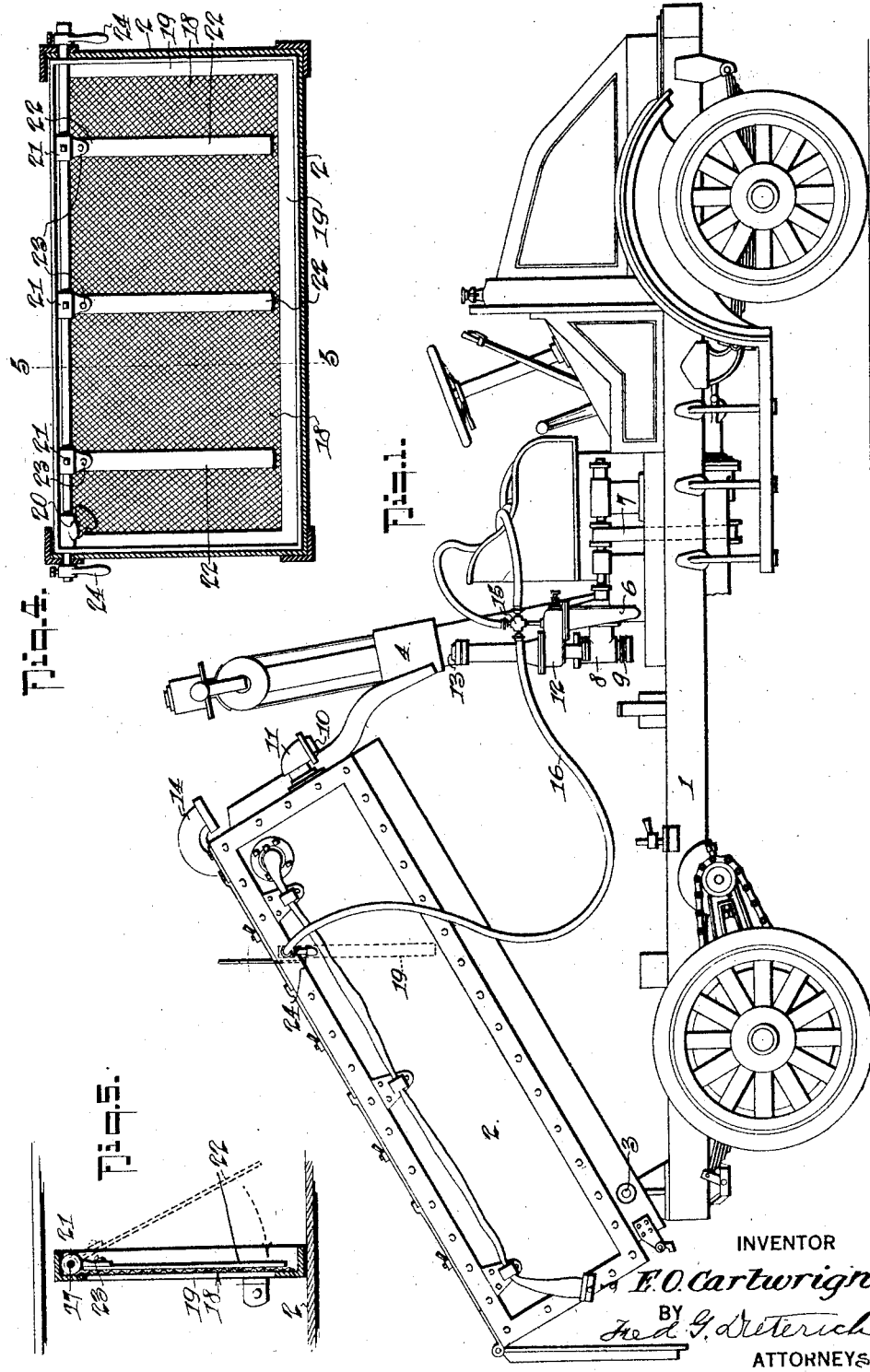

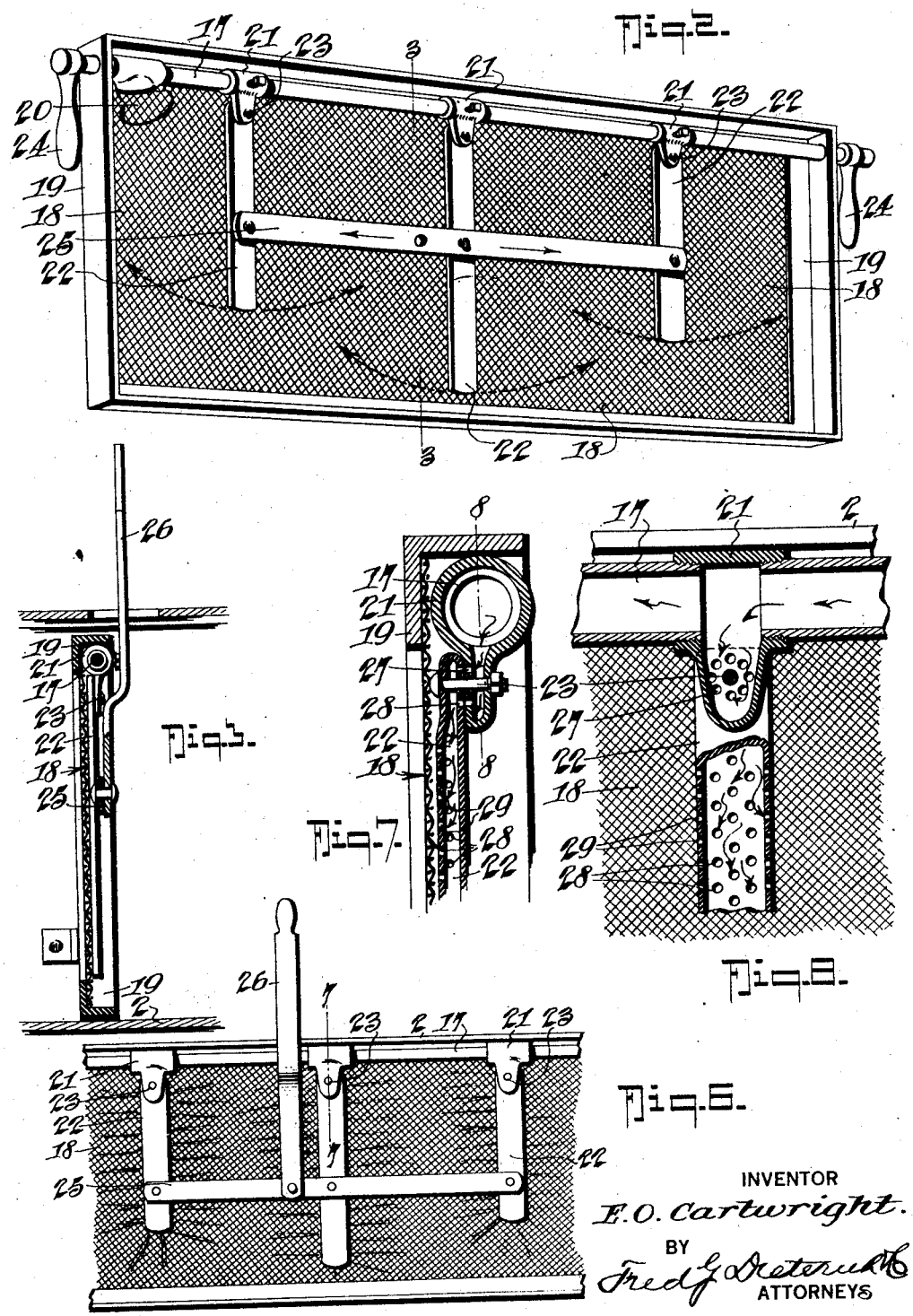

ERNEST O. CARTWRIGHT, OF SPRINGFIELD, OHIO, ASSIGNOR TO CHARLES F. GARDNER, OF SPRINGFIELD, OHIO.

PORTABLE PUMPING APPARATUS.

1,331,900.  Specification of Letters Patent.  Patented Feb. 24, 1920.

Application filed May 26, 1919. Serial No. 299,735.

*To all whom it may concern:*

Be it known that I, ERNEST O. CARTWRIGHT, a citizen of the United States, residing at Springfield, in the county of Clark and State of Ohio, have invented a new and Improved Portable Pumping Apparatus, of which the following is a specification.

My invention, which relates to that class of pumping apparatus shown in my application for Letters Patent filed Oct. 25, 1918, Serial No. 259,668, and in my application for Letters Patent filed March 6, 1919, Serial No. 280,976, has especially for its object to provide certain new and useful improvements in regard to the means for cleaning the screens of the settling tank and to that end the invention more specifically relates to the structure illustrated in my second application above mentioned.

In my application, Serial No. 280,976, I have disclosed a structure in which is provided a screen for separating the tank into a plurality of chambers whereby the solid material will be retained in one chamber while the liquid material will pass through the screen into the other chamber, and in that application I have also disclosed means whereby the screen may be washed to free it from clinging matter. My present invention has for its object to provide an improved means for cleaning the screen and to that end the invention provides a number of blades or paddle members carried by a rock shaft with provision whereby the shaft may be rocked to cause the paddle members to strike the mesh of the screen and thereby aid in dislodging clinging material therefrom.

The invention further has for its object to provide means whereby the paddle members may be employed as scrapers to scrape material from the clinging surface of the screen and in another embodiment of the invention, the paddle members may have provision to act as washers to enable a stream of wash water to be projected against the stream as the paddles are swung into and out of engagement with the screen or laterally for scraping purposes.

In its more detail nature, the invention includes those novel details of construction, combination and arrangement of parts, all of which will be first fully described, then be specifically pointed out in the appended claims and illustrated in the accompanying drawings, in which:—

Figure 1 is a side elevation of a portable pumping apparatus embodying the invention.

Fig. 2 is a detail perspective view of one of the specific embodiments of the invention showing the screen with the paddles arranged to be operated in unison as scrapers.

Fig. 3 is a transverse section of the same on the line 3—3 of Fig. 2.

Fig. 4 is a cross section through the tank showing another specific embodiment of the invention.

Fig. 5 is a cross section on the line 5—5 of Fig. 4.

Fig. 6 is a detail elevation of another specific embodiment of the invention.

Fig. 7 is an enlarged detail cross section of the same on the line 7—7 of Fig. 6.

Fig. 8 is a detail section taken substantially on the line 8—8 of Fig. 7, the parts being broken away.

In the drawings, in which like numerals of reference indicate like parts in all of the figures, 1 represents the chassis frame of the motor vehicle (which vehicle may be of the usual type) and on which the tank 2 is pivoted near the rear at 3, the front of the tank being arranged to be raised and lowered by a suitable elevating mechanism 4 of the usual construction.

The driving shaft of the centrifugal pump 6 is operated from the vehicle power plant through a driving connection 7 of any desired or approved type. To the intake of the suction side of the pump is coupled a three-way union member 8 whose lower end may be tapped and provided with a nipple plug 9 (Fig. 1) and whose upper end is adapted to be engaged by the nipple 10 on the elbow 11 of the suction outlet from the tank when the tank is in the lowered position. The elbow 11 communicates with the liquid compartment of the tank in the usual way (see my applications above referred to).

To the outlet side of the pump 6 is connected an ejector mechanism 12, the discharge end of which is provided with a nipple 13 to couple with the elbow 14 that carries the nozzle (not shown) which delivers the material into the settling chamber of the tank. The ejector 12 has a pressure chamber that communicates with a distributing union 15 to which one or more hose connections 16 may be coupled, one of which hose connections 16 may be employed for delivering washing fluid to the pipe 17 adjacent to the face of the screen. The screen 18 preferably consists of a wire mesh or perforated body held in a suitable angle iron frame 19 and pivotally mounted on the transverse pipe 17 which acts as the axis of movement of the screen 18 whereby the screen 18 may swing as shown in dotted lines in Fig. 1 to allow of the discharge of any sediment that might collect in the liquid chamber, the shaft 17 may be a hollow pipe for delivering the washing fluid to the nozzle 20 by which it is projected over the screen 18 to clear off the material therefrom. All of the parts heretofore described may be of the usual construction and, *per se*, constitute no part of the present invention, as the subject matter thereof is embodied in my application Serial No. 280,976 aforesaid.

I will now describe those features which constitute the present invention. On the shaft 17 is mounted, in any suitable way, supporting collar members 21 to which blades 22 are secured, preferably by a pivotal connection 23. The shaft 17 is journaled in suitable bearing apertures in the side walls of the tank 2 and is provided with handles 24 by means of which the shaft can be rocked independently of the screen to cause blades 22 to leave and return into engagement with the screen with a patting movement so as to impact the screen and jar loose any clinging solids.

In another embodiment of the invention (see Fig. 2) the various blades or paddles 22 are connected together by a bar 25 so that the paddles have movement on their pivots 23 to scrape the screen 18, as shown in dotted lines in Figs. 2, 3 and 6.

The scraping motion may be imparted to the blades 22 manually by the operator grasping the cross bar 25 and reciprocating it or any suitable handle 26 may be provided for that purpose.

Another embodiment of the invention is illustrated in Figs. 6 to 8, inclusive, in which I have combined with the patting and scraping functions of the blades 22, a washing function as well. By reference to these figures, it will be noticed that the collars 23 are provided with a chambered projection 27 which is in communication with the interior of the pipe 17 and is itself provided with ports 28 that communicate with similar ports 19 in the paddles or blades 22 which, in this instance, are hollow and are provided with outlet ports 28 for projecting a spray or stream of fluid through the screen and also ports 29 in the edge of the paddle for spraying the face of the screen, thereby washing the surface as well as providing a means for patting it and scraping it.

Of course, when the embodiment of the invention illustrated in Figs. 6 to 8, inclusive, is employed, the nozzle 20 may be omitted.

From the foregoing description taken in connection with the accompanying drawings, it is thought the complete operation, construction and the advantages of the invention will be readily understood by those skilled in the art, and I desire it understood that in the present application I do not limit the use of the invention to cleaning of screens in tanks of this specific nature as the invention may be employed wherever it is found adaptable. I also wish it understood that changes in the details of construction and arrangement of parts may be made without departing from the spirit of the invention and the scope of the appended claims.

What I claim is:—

1. In apparatus of the class described, a settling tank, a screen within said tank, and a paddle device for engaging said screen to jar material loose therefrom.

2. In combination with a screen, a paddle blade mounted adjacent to the screen and provided with means whereby the said blade may be swung into and out of engagement with the screen.

3. In combination with a screen, a shaft mounted across the face of the screen, blades pendent from the shaft, and means for rocking said shaft to cause said blades to pat the screen.

4. The combination with a screen, a shaft rockably journaled adjacent to the face of the screen, blades pendently supported from the shaft and means whereby said blades may be moved across the face of the screen to scrape the same.

5. The combination with a screen, a shaft rockably journaled adjacent the face of the screen, blades pendently supported from the shaft, means whereby said blades may be moved across the face of the screen to scrape the same, and means whereby said shaft may be rocked to cause said blades to jar the screen.

6. In combination with a screen, a combined screen patter, scraper and washer device.

7. In combination with a screen, a device for patting and scraping the face of the screen.

8. In combination with a screen, a hollow shaft journaled to lie along the face of the screen, fluid distributing unions carried by said shaft, fluid distributing blades connected to said unions and lying against the face of the screen.

9. In combination with a screen, a hollow shaft journaled to lie along the face of the screen, fluid distributing unions carried by said shaft, fluid distributing blades connected to said unions and lying against the face of the screen, and means whereby said shaft may be rocked to move said blades toward and from the face of the screen.

10. In combination with a screen, a hollow shaft journaled to lie along the face of the screen, fluid distributing unions carried by said shaft, fluid distributing blades connected to said unions and lying against the face of the screen, and means whereby said blades may be moved across the face of the screen in a plane parallel thereto.

11. In combination with a screen, a hollow shaft journaled to lie along the face of the screen, fluid distributing unions carried by said shaft, fluid distributing blades connected to said unions and lying against the face of the screen, means whereby said shaft may be rocked to move said blades toward and from the face of the screen, and means whereby said blades may be moved across the face of the screen in a plane parallel thereto.

ERNEST O. CARTWRIGHT.